United States Patent [19]

Smith

[11] 4,180,013

[45] Dec. 25, 1979

[54] ANIMAL BEHAVIORAL CONTROL DEVICE

[76] Inventor: Thomas M. Smith, 3445 Wadsworth Blvd., #7, Wheat Ridge, Colo. 80033

[21] Appl. No.: 851,517

[22] Filed: Nov. 14, 1977

[51] Int. Cl.² .............................................. A01K 15/00
[52] U.S. Cl. .................................................... 119/29
[58] Field of Search .................. 119/29; 128/2 R, 2 S; 361/232

[56] References Cited

U.S. PATENT DOCUMENTS

| | | | |
|---|---|---|---|
| 2,741,224 | 4/1956 | Putnam | 119/29 |
| 3,024,783 | 3/1962 | Timcke | 128/2 R |

*Primary Examiner*—Hugh R. Chamblee

*Attorney, Agent, or Firm*—Burton & Dorr

[57] ABSTRACT

An animal behavioral control device having a microphone responsive to both ambient noise around the animal and to emitted sound from the animal such as barking for extending an electrical signal corresponding only to the emitted sound and a vibrating apparatus being activated in the presence of the electrical signal for vibrating the area of the animal's neck nearest the vocal cords to cause the animal to be distracted either in a first range of preferred vibration in a first embodiment of the invention, or to swallow in a second range of preferred vibration in a second embodiment of the invention thereby substantially preventing the animal from emitting the barking sound.

10 Claims, 9 Drawing Figures

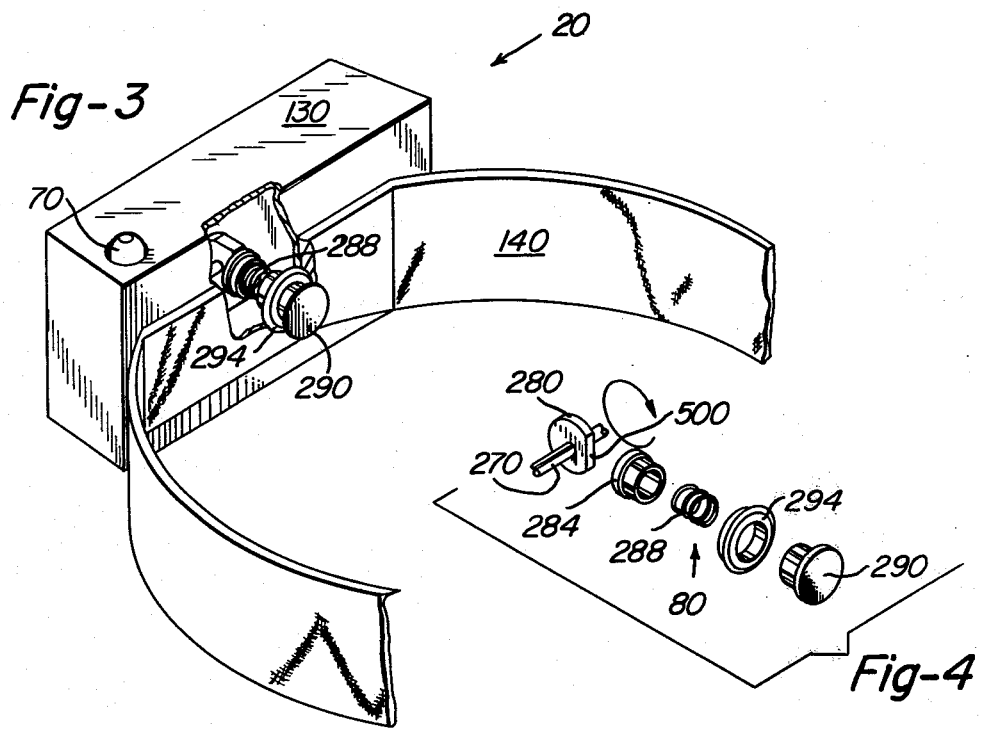
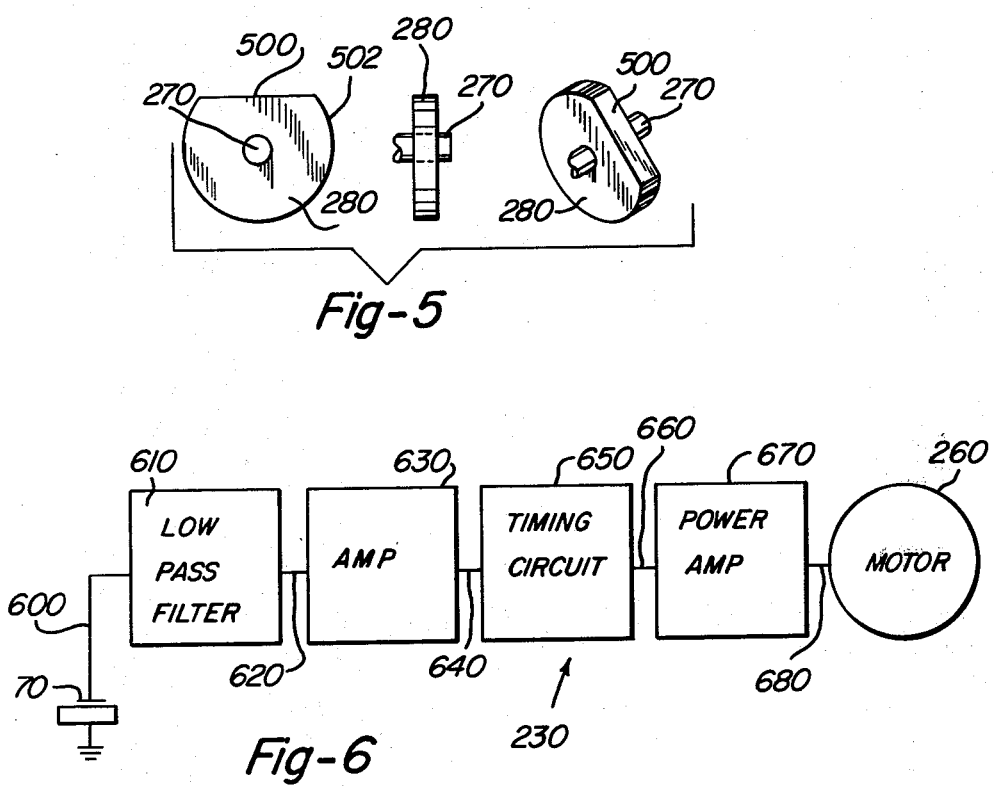

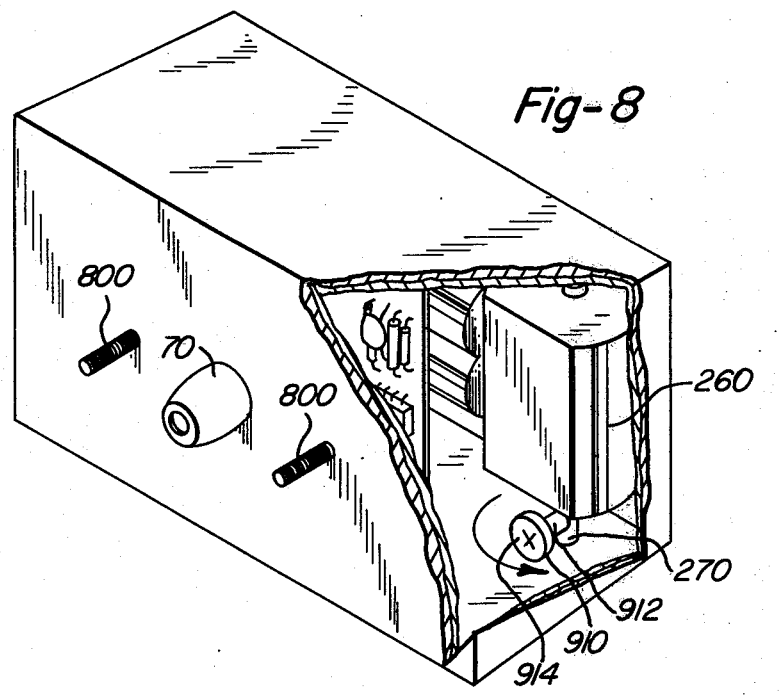
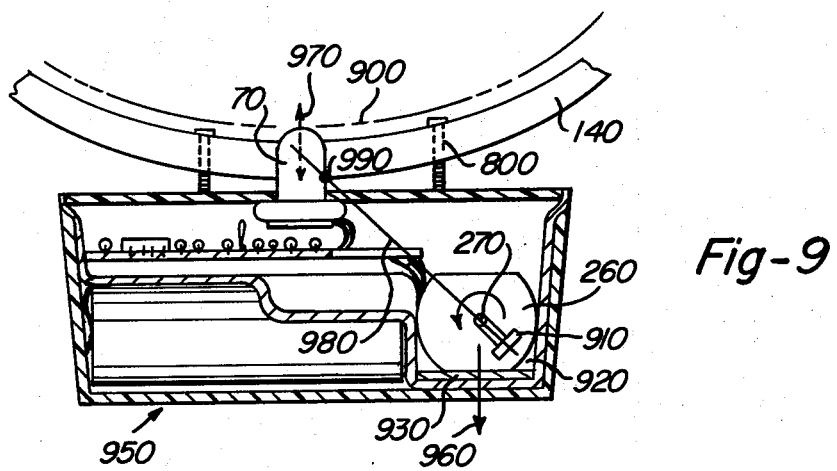

ANIMAL BEHAVIORAL CONTROL DEVICE

BACKGROUND OF THE INVENTION

1. Field of the Invention

This invention relates to devices for controlling animal behavior by means of generating a stimulus in response to an observed condition and, more particularly, to a device for substantially preventing the barking of a dog through mechanical vibration of the area of the dog's neck containing the vocal cords.

2. Background of the Invention

The most prevalent prior art approach for controlling the barking of dogs is the use of an electric shock stimulus generated in the area of the neck of the dog. By applying electric shock simultaneously with the barking of the dog, the dog quickly becomes conditioned not to bark in the presence of the shock. However, this prior art approach has been deemed to be cruel to animals and has been outlawed by the Food and Drug Administration.

One approach eliminating electrical shock control for dog barking control is taught by "Tri-Tronics", 7060 E. 21st Street, P.O. Box 17660 Dept. D.W., Tucson, Ariz. In this approach a burst of high pitched sound lasting about two seconds is emitted in response to the barking of the dog. The sound burst startles the dog and interrupts its train of thought.

The behavioral control device of the present invention eliminates the pronounced disadvantage accompanying the electric shock technique by utilizing two separate principles to substantially eliminate the barking of a dog. The first principle and first preferred embodiment of the present invention is based upon generating a distraction vibration of high frequency to disrupt the pointing vector of a dog mentally. The second principle and second preferred embodiment of the present invention is based upon mechanically vibrating the vocal cords of the dog with low frequency vibration to effectuate swallowing by the dog thereby physically disabling the dog from barking.

OBJECTS OF THE PRESENT INVENTION

It is an object of the present invention to provide a new and improved device for controlling the behavior of animals.

It is a further object of the present invention to provide a new and novel device which in response to a predetermined pattern of sound emitted by the animal, mechanically vibrates a portion of the animal's neck nearest the vocal cords in order to effectuate swallowing by the animal.

It is another object of the present invention to provide a new and novel device for controlling the behavior of an animal wherein vibration distracting the pointing vector of the animal is generated in response to a predetermined pattern of sound emitted by the animal.

It is a further object of the present invention to provide a new and novel device for controlling the behavior of an animal wherein a microphone generates electrical signals corresponding both to an ambient noise signal around the animal and to an emitted sound of the animal, a filter for filtering out the electrical noise signals and for extending only the electrical signals corresponding to the emitted sound, a timing circuit for producing a time period having a predetermined time duration in response to the generation of the signal corresponding to the emitted sound, and a vibrator for vibrating the neck area of the animal nearest the vocal cords for the duration of the time period.

It is a further object of the present invention to provide a new and novel device for controlling the behavior of an animal wherein a microphone generates electrical signals corresponding both to an ambient noise signal around the animal and to an emitted sound of the animal, a filter for filtering out the electrical noise signals and for extending only the electrical signals corresponding to the emitted sound, a timing circuit for producing a time period having a predetermined time duration in response to the generation of the electrical signal corresponding to the emitted sound, and a vibrator for vibrating the neck area of the animal nearest the vocal cords for producing a distraction vibration to disrupt the pointing vector of the animal during the time period.

Other objects, advantages and capabilities of the present invention will become more apparent as the description proceeds taken in conjunction with the accompanying drawings.

DESCRIPTION OF THE DRAWING

FIG. 3 is a perspective view of the first embodiment of the control device of the present invention with a partial cutaway showing the plunger mechanism of the present invention.

FIG. 4 is an exploded perspective view of the various components of the plunger mechanism shown in FIG. 3.

FIG. 5 details several views of the cam of FIG. 4 of the present invention.

FIG. 6 is a block diagram setting forth the various electronic components utilized to control the behavioral control device of the present invention.

FIG. 8 is a perspective view with a partial cutaway showing the second embodiment of the behavioral control device of the present invention.

FIG. 9 is a cross-sectional view of the second embodiment of the behavioral control device of the present invention showing the beater mechanism of the present invention.

SUMMARY OF THE INVENTION

A device for substantially eliminating the barking of a dog is presented to include a microphone responsive both to ambient noise and to the barking sound of the dog for generating corresponding electrical signals and an electronic circuit receptive of the signals from the microphone for activating a vibrator only when barking is detected and then only for a predetermined period of time.

The electronic circuit of the present invention includes a filter for filtering out the ambient sound and for extending only electrical signals corresponding to the predetermined sound, an amplifier for amplifying the extended signal, a timing circuit which becomes activated for a predetermined time whenever the amplified signal is present, and a power supply circuit which becomes activated during the predetermined time period of the timing circuit for activating the vibrator.

In a first embodiment, the vibrator operates at low frequencies (i.e. less than 10 pulses per second) and comprises a plunging mechanism activated by a cam which is coupled to the shaft of an electric motor. The cam engages a plunging mechanism which includes a spring, a first plunger connected to one end of the spring and engaging the cam and a second plunger engaging the opposing end of the spring for vibrating the vocal cords of the dog. The use of the spring minimizes the possibility of motor burnout due to binding since the first plunger can always move in relationship to the movement of the cam even though the second plunger becomes bound.

In a second embodiment, the vibrator operates at higher frequencies (i.e. several hundred pulses per second) and comprises a beater affixed to the shaft of an electric motor. The beater abuts the housing containing the motor and causes the housing to vibrate through a mechanical advantage. The vibration is delivered into the animal through the microphone which is disposed into the neck area of the animal.

DETAILED DESCRIPTION

Figure 1:
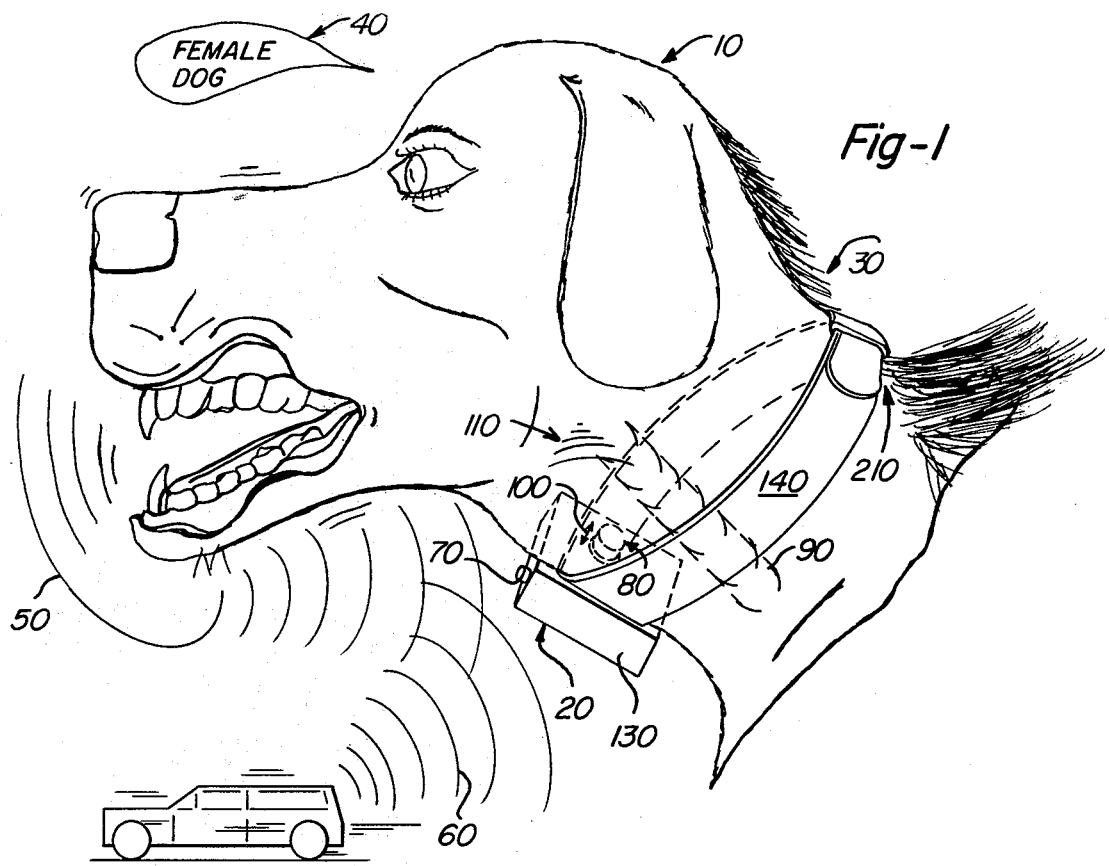
FIG. 1 is an illustration showing a dog using the behavioral control device of the present invention strapped around its neck in the vicinity of the vocal cords.

The operation of the first preferred embodiment of the present invention is shown by reference to FIG. 1 which includes a conventional dog 10 wearing the device 20 of the present invention around its neck 30. The dog 10 in response to a signal or pointing vector 40 (in this case being a female dog) is emitting barking noise 50. The device 20 of the present invention has for its purpose to stop the barking noise 50 being generated by the dog 10 in response to the pointing vector 40. The device 20, therefore, receives the barking noise 50 and any other ambient noise 60 (such as that of a nearby moving car) by means of a microphone 70. The device 20 is designed so that whenever barking noise 50 is detected in the ambient noise 60 a plunger mechanism 80 becomes activated which vibrates against the throat 30 of dog 10 in the area nearest the vocal cords 90. The mechanical vibration 100 affects the vocal cords 90 causing the dog to swallow. The swallowing action of the dog substantially disrupts its capability to bark.

In a second preferred embodiment, distraction vibration 110 is imparted to the dog, as will be discussed in greater detail later. The distraction vibration 110 causes the dog 10 to have its pointing vector 40 disrupted thereby substantially eliminating the dog's reason for barking. It is to be expressly understood that either approach (i.e. the first embodiment causing the dog to swallow or the second embodiment causing disruption of the pointing vector) substantially reduces the barking noise 50 of a dog 10.

Of course, the teachings of this invention can be adopted to any animal wherein the pointing vector 40 and the vocal cords 90 can be stimulated in response to a predetermined sound being eminated from the animal.

As shown in FIG. 1, the device 20 includes a housing 130 and a releasable strap 140. It is apparent, therefore, that the device 20 of the present invention can be rapidly mounted and dismounted from the region around the animal's neck.

Figure 2:
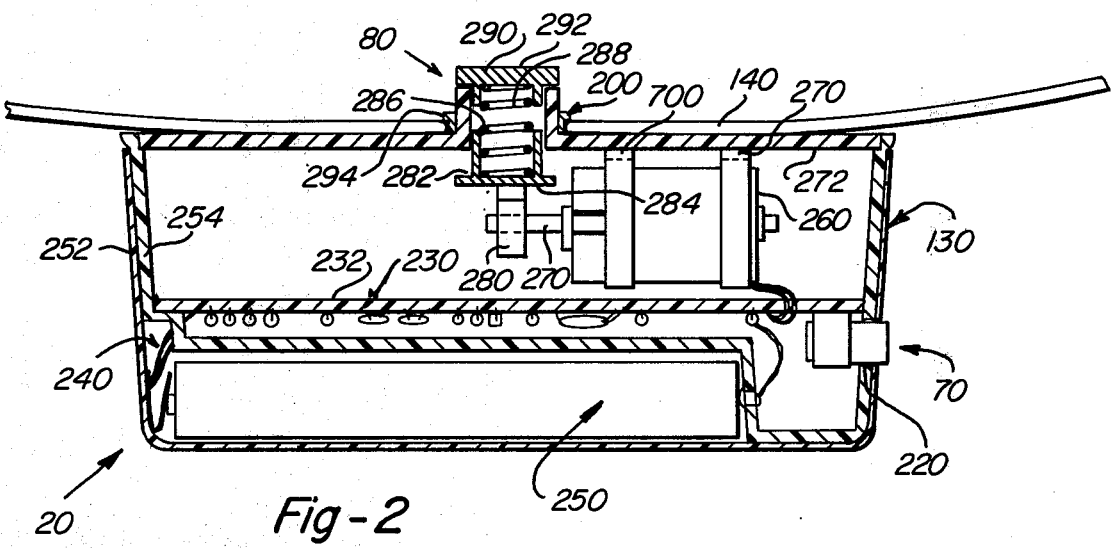
FIG. 2 is a cross-sectional view of the first embodiment of the behavioral control device of the present invention illustrating the various components contained therein.

The internal components of the first embodiment of the present invention 20 are set forth in cross-sectional detail in FIG. 2. The housing 130 envelopes the internal components of the device 20 and is attached conventionally at point 200 to the strap 140. The strap 140 as shown in FIG. 1 is releasably connectable to the neck by means of buckle 210.

The microphone 70 is disposed through a first hole 220 in the housing 130. The microphone is interconnected with circuitry 230 which is physically oriented on a board 232 disposed on the interior of the housing 130. Disposed beneath the circuitry 230 is a battery compartment 240 containing a battery 250 which supplies power to the entire device 20. It is to be expressly understood that the mounting of the circuitry 230 and the provision of a compartment 240 with batteries 250 contained therein is conventional in the art and may actually comprise any of a number of different approaches for self-containing the circuitry 230 in the device 20. What is important, however, is to provide a waterproof housing 20. To accomplish this, the housing 130 has a shell outer covering 252 which substantially overlaps an inner-frame member 254 in three-dimensional orientation so that surface between shell 252 and frame member 254 substantially engages thereby preventing the introduction of any moisture into the device 20. This overlapping relationship is best illustrated in FIG. 2.

As mentioned, when the microphone 70 detects the barking signal 50, the circuitry 230 processes the signal and activates a motor 260 which is mounted conventionally by means of straps 270 to the interior upper surface 272 of the frame member 254. The motor 260 has a drive shaft 270 upon which is affixed a cam 280. The cam 280 operates the plunger mechanism 80 which includes a first plunger 282 which has a first end 284 abutting the peripheral surface 280 of the cam, and a second end 286 which is receptive of a coil spring 288. It also includes a second plunger 290 which has a first end 292 for abutting the neck of the dog 10 and a second end 292 which is also connected to the opposing end of the coil spring 288. A grommet 294 seals the two plungers within the housing in a water tight relationship.

In operation, the cam, due to its eccentric shape, causes the first plunger 284 to move in the direction of arrows 100. Through interaction of the coil spring 288, the second plunger 292 also moves in direction of arrows 100. The spring 288 performs a valuable function, whenever the plunger 292 binds so that it cannot move in direction 100, the spring 282 allows the cam 280 and the driveshaft 270 to still rotate thereby preventing the motor 260 from burning out whenever a binding engagement is found on plunger 290. The second plunger 290 provides the mechanical vibration of sufficient strength to affect the vocal cords 90 of the dog 10 to cause the dog 10 to swallow. The motor is geared to provide a plunger pulsation rate of less than 10 pulses per second which for most dogs provides good stimulus for the swallowing mechanism.

In FIGS. 3 and 4 are shown the details of the plunger mechanism 80 as it cooperates with the housing 130 and the belt 140. The details of the cam 280 are shown in FIG. 5 in various views. The cam is substantially circular in shape but for a flat region 500 which causes the plunger to be in the most detracted position. On the contrary, as the surface 284 of plunger 282 leaves surface 500 and engages surface 502, the plunger 290 is suddenly thrust against the neck area of the dog nearest the vocal cords.

In FIG. 6, is shown a block diagram setting forth the basic component areas of the electronic circuitry controlling the device 20 of the present invention. The circuitry 230 receives electrical signals appearing on lead 600 correspond to the two types of sound received by microphone 70—i.e., the barking sound 50 and ambient noise 60. The barking sound and the ambient noise electrical signals appearing on lead 600 are delivered to a low pass filter 610 which functions to filter out the electrical noise signals corresponding to the ambient noise 60 and to pass only those signals corresponding to the barking sound 50 onto lead 620. Therefore, the low pass filter 610 acts as a discriminator and functions only to produce an electrical signal on lead 620 whenever a barking sound 50 is present. That electrical signal appearing on lead 620 is delivered into an amplifier 630 which amplifies the signal 620 and places it on lead 640. Whenever a signal appears on lead 640, the timing circuit 650 becomes activated to produce a signal corresponding to a time period of a predetermined duration appearing on lead 660. That signal appearing on lead 660 then causes a power amplifier 670 to operate which places sufficient power on lead 680 to drive the motor 260 in a conventional fashion.

In operation, the circuitry 230 drives the motor 260 for a predetermined period of time determined by the timing circuit 650. Whenever a barking sound 50 is detected by the microphone 70, the low pass filter detects that signal and places it on lead 620 which in turn is amplified by amplifier 630 and is placed on lead 640. The signal on lead 640 activates the timing circuit 650 which in turn places a signal having a predetermined time duration on lead 660 to operate the power amplifier for that time duration which in turn drives the motor 260. As will be pointed out in the ensuing discussion, through proper selection of components, the time period duration appearing on lead 660 can be selected in advance. It is to be expressly understood, that one skilled in the art can design component 610, 630, 650 and 670 in a variety of different manners.

Figure 7:
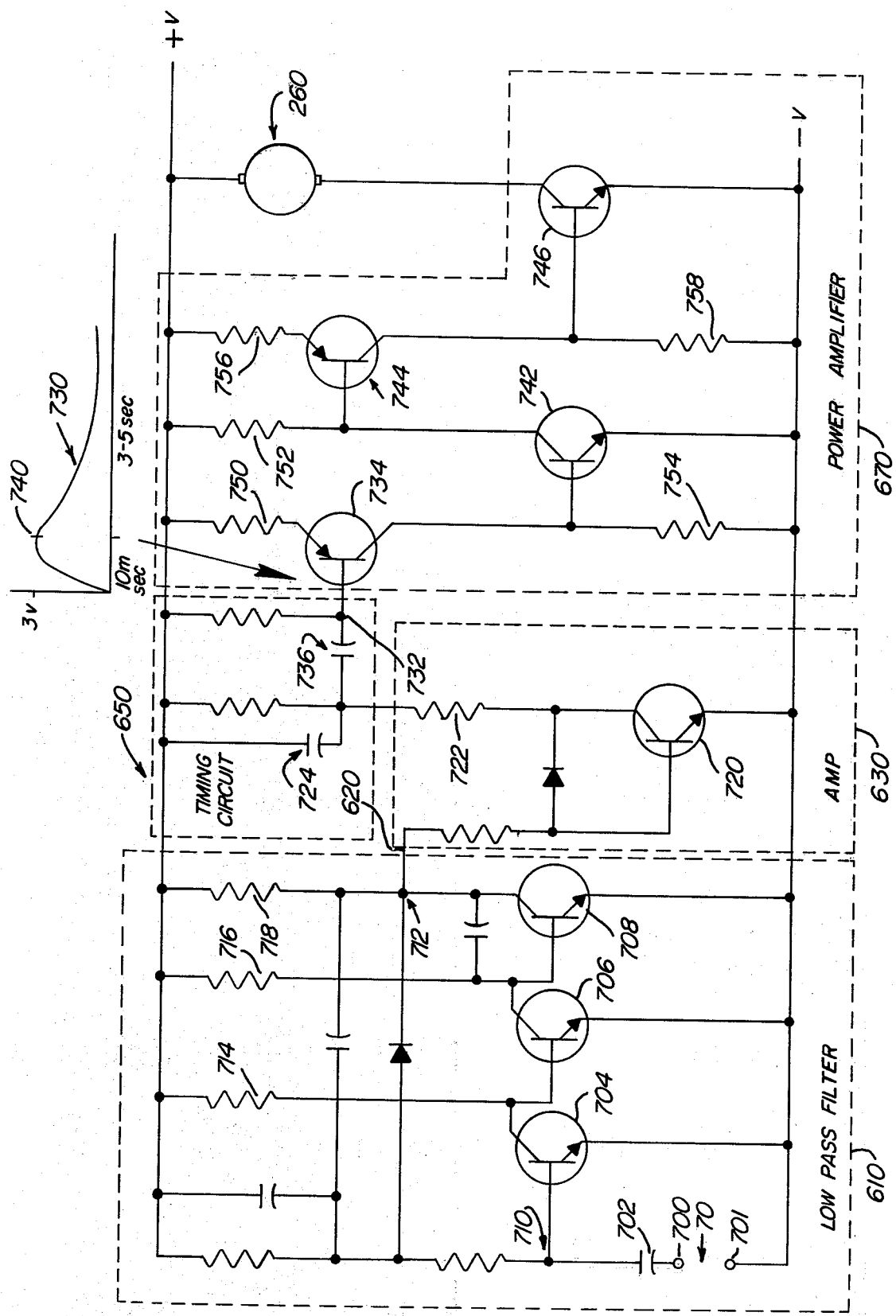
FIG. 7 is a circuit schematic of the block diagram shown in FIG. 6.

The details of the electronic circuit shown in block diagram at FIG. 6 are shown in FIG. 7. The microphone 70 is connected at terminals 700 and 701. Terminal 701 is connected to ground while terminal 700 is connected through direct current voltage blocking capacitor 702. Circuit 610 operates as a low pass filter detecting the presence of a substantially 2 KHz signal corresponding to the dog's barking frequency. Transistors 704, 706, and 708 are interconnected as a Schmitt clamped amplifier so that the presence of a 2 KHz signal at node 710 causes the output of the circuit at node 712 to be an approximately 2.5 volt 2 KHz voltage signal. Transistor 704, 706, and 708 are conventional and may comprise those conventionally available and known as:

2N3565

2N3646

The collector load resistors have the following values:

Resistor 714 = 10 Kohms

Resistor 716 = 10 Kohms

Resistor 718 = 3.3 Kohms

The finite voltage signal appearing at node 712 is delivered onto lead 620 into the amplifier 630 causing transistor 720 to become activated to the ON state. One end of resistor 722 is placed substantially to ground through the ON state of transistor 720 and causes capacitor 724 to act as a time constant for continued activation of the filter 610 as will be explained later. Prior to the detection of the barking signal, the potential on lead is approximately 3 volts. When the barking signal is detected by microphone 70, as previously mentioned, transistor 720 is turned ON to bring one end of resistor 722 to ground. Capacitor 736 immediately charges up (within a 10 millisecond period) to the value of the now discharging voltage appearing on capacitor 724 through resistor 722. At that point, designated 740, in curve 730, transistor 734 turns on which causes transistor 742 to turn ON and which causes transistor 744 to turn ON. This in turn activates transistor 746 which activates the motor 260. The power amplifier 670 have resistors with the following values:

Resistor 750 = 100 ohms

Resistor 752 = 10 Kohms

Resistor 754 = 33 Kohms

Resistor 756 = 10 ohms

Resistor 758 = 10 Kohms

Even though the barking of the dog stops, the electrical motor 260 generates an electrical noise which is delivered onto the +V line into the base of transistor 704. The electrical motor noise acts as a fictitious bark and maintains the low pass filter in an active state until the capacitor 724 discharges as shown in curve 730 to turn transistor 734 OFF and, therefore, to prevent delivery of power to motor 260. At this time, no further motor electrical noise is generated and the circuit becomes deactivated until the next bark.

In summary, the presence of barking sound, only, which is at a predetermined frequency, the elecronic circuitry of the present invention is activated for a predetermined time period to apply power to the motor. As shown in FIGS. 1 through 5, the motor activates a plunging mechanism which operates at a predetermined frequency of less than 10 pulses per second to cause the dog 10 to swallow, thus disrupting the bark.

In FIGS. 8 and 9 are shown the details of the second approach of the present invention wherein the microphone 70 is placed in the position of the plunger of the first embodiment and abuts the neck 900 of the dog. The collar 140 firmly abuts the microphone 70 to the neck area 900. Screws 800 are used to affix the collar 140 to the second embodiment.

In all respects, the microphone 70, the electronic circuitry, and the housing are the same as previously discussed. What varies, however, is the orientation of the motor and the elimination of the plunger mechanism of the prior approach. In this approach, the motor 260 has connected to its shaft 270 a beater element 910. Beater element 910 has a shaft portion 912 and a head portion 914 extending therefrom. As shown in FIG. 9, the motor 260 is disposed in a cavity 920 having a ledge area 930. As the motor shaft 270 rotates in the counterclockwise direction, with each revolution, the head 914 of the beater 910 abuts the surface 930 thereby imparting vibration to the entire housing 950. This vibration is shown by arrow 960, and is translated to vibration 970 through a mechanical advantage. The mechanical advantage is caused by the fact that the motor 260 being of heavier weight is located in the extreme end of the housing 950 thereby causing multiplication of the vibration at the earphone piece 70. Mechanical advantage is seen through line 980 whereby the heavy weight of the motor 260 causes a pivoting about a point designated 990. It is apparent that the heavy weight of the motor 260 in conjunction with the vibratory force imparted to it by beater 910 causes significant vibration to occur through the earphone to abut the neck of the animal. This vibration occurs at the rate of several hundred pulses per second and provides a significant vibratory distraction to the pointing vector of the dog.

While several embodiments of the present invention have been described in detail herein, various changes and modifications can be made without departing from the scope of the invention.

I claim:

1. A device for controlling the behavior of an animal, said device further comprising:
   means in said device releasably connectable to said animal for generating a signal in response to the start of a predetermined pattern of sound emitted by said animal, and
   means releasably connectable around the neck of said animal operative only upon receipt of said signal for applying mechanical vibration to the area of said neck nearest to the vocal cords of said animal, said vibration being of sufficient intensity and duration to cause said animal to swallow and to cause the dog to be incapable of completing the emitted sound.

2. The device of claim 1 in which said applying means comprises:
   means receptive of said signal for producing a time period having a predetermined duration, and
   means operative only during said time period for activating said applying means, said applying means being capable of applying said vibration only during said time period.

3. A device for controlling the behavior of an animal, said device comprising:
   means releasably connectable to said animal for generating a signal in response to a predetermined pattern of sound emitted by said animal, means releasably connectable around the neck of said animal operative upon receipt of said signal for applying mechanical vibration to the area of said neck nearest to the vocal cords of said animal, and in which said applying means comprises;
   a motor, said motor having a drive shaft,
   a cam coupled to said shaft, and
   means responsive to the movement of said cam for mechanically vibrating said neck area, said mechanical vibration causing said animal to swallow.

4. A device for controlling the behavior of an animal, said device comprising:
   means releasably connectable to said animal for generating a signal in response to a predetermined pattern of sound emitted by said animal, means releasably connectable around the neck of said animal operative upon receipt of said signal for applying mechanical vibration to the area of said neck nearest to the vocal cords of said animal, and in which said applying means comprises;
   a motor, said motor having a drive shaft,
   means connected to said drive shaft for imparting vibration to said motor, and
   means operative with the vibration of said motor for extending said vibration to said neck area, said vibration being capable of disturbing said animal's pointing vector.

5. A device in a housing for controlling the barking of a dog, said device comprising:
   a microphone responsive both to ambient noise around said animal and to the emitted sound from said animal for converting said ambient noise and said emitted sound into corresponding electrical noise and sound signals,
   means receptive of said noise and emitted signals from said microphone for filtering out said electrical noise signals, said filtering means being capable of extending only said emitted sound electrical signal,
   a motor, said motor having a drive shaft,
   means receptive of said extended signal for producing a time period having a predetermined duration,
   means operative only during said time period for activating said motor, and
   means connected to said drive shaft for mechanically vibrating the neck area of said dog.

6. The device of claim 5 wherein said vibrating means comprises:
   a cam connected to said drive shaft,
   a spring,
   a first plunger having an end abutting the periphery of said cam, the opposing end of said first plunger being connected to a first end of said spring, and
   a second plunger having an end for abutting said neck area, the opposing end of said second plunger being connected to said second end of said spring, said housing forming a tunnel configuration around said first and second plungers to fixedly contain said first and second plungers and said spring.

7. The device of claim 5 in which said vibrating means comprises:
   means connected to said drive shaft for imparting vibration to said housing, and
   means operative with the vibration of said motor for extending said vibration to said neck area, said vibration being capable of disturbing said animal's pointing vector.

8. A device for controlling barking of a dog, said device comprising:
   a releasable strap, said strap being capable of firmly engaging the periphery of said dog's neck,
   a housing attached to the outer surface of said strip, said housing having first and second formed holes,
   a microphone disposed through said first hole, said microphone being responsibe to ambient noise and to the sound of said barking for generating electrical signals corresponding to said noise and said sound,
   a low pass filter in said housing receptive of said electrical signals from said microphone for filtering those electrical signals corresponding to said ambient noise and for extending only those electrical signals corresponding to said barking sound,
   an amplifier in said housing receiving said extended electrical signals for amplifying said extended signal,
   a timing circuit in said housing operative upon the resence of said amplified signal for producing a pulse having a predetermined length in time, and
   means operative with the duration of said pulse for applying mechanical vibration through said second hole to the area of said dog nearest to the vocal cords of said dog causing said dog to swallow, the mechanical vibration being of sufficient intensity and duration to stop said dog from barking.

9. A device for controlling barking of a dog, said device comprising:
- a releasable strap, said strap being capable of firmly engaging the periphery of said dog's neck,
- a housing attached to the outer surface of said strap, said housing having first and second formed holes,
- a microphone disposed through said first hole, said microphone being responsive to ambient noise and to the sound of said barking for generating electrical signals corresponding to said noise and said sound,
- a low pass filter in said housing receptive of said electrical signals from said microphone for filtering those electrical signals corresponding to said ambient noise and for extending only those electrical signals corresponding to said barking sound,
- an amplifier in said housing receiving said extended electrical signals for amplifying said extended signal,
- a timing circuit in said housing operative upon the presence of said amplified signal for producing a pulse having a predetermined length in time,
- a motor, said motor having a drive shaft,
- means operative with the duration of said pulse for driving said motor,
- a cam connected to said drive shaft,
- a spring,
- a first plunger located in said second hole, said first plunger having an end abutting the periphery of said cam, the opposing end of said first plunger being connected to a first end of said spring, and
- a second plunger located in said second hole, said second plunger having an end for abutting said neck area, the opposing end of said second plunger being connected to said second end of said spring, said housing forming a tunnel configuration around said second hole to fixedly contain said first and second plungers and said spring.

10. A device for controlling barking of a dog, said device comprising:
- a releasable strap, said strap being capable of firmly engaging the periphery of said dog's neck,
- a housing attached to the outer surface of said strap, said housing and strap having a hole formed therethrough in the area of the vocal cords of the dog's neck,
- a microphone disposed through said hole, said microphone being responsive to ambient noise and to the sound of said barking for generating electrical signals corresponding to said noise and said sound,
- a low pass filter in said housing receptive of said electrical signals from said microphone for filtering those electrical signals corresponding to said ambient noise and for extending only those electrical signals corresponding to said barking sound,
- an amplifier in said housing receiving said extended electrical signals for amplifying said extended signal,
- a timing circuit in said housing operative upon the presence of said amplified signal for producing a pulse having a predetermined length in time,
- a motor, said motor having a drive shaft,
- means operative with the duration of said pulse for driving said motor,
- means connected to said drive shaft for imparting vibration to said housing, and
- means operative with the vibration of said motor for extending said vibration into said microphone, said vibrating microphone being capable of disturbing said dog's pointing vector.

* * * * *